United States Patent [19]
Lyu et al.

[11] Patent Number: 5,764,359
[45] Date of Patent: Jun. 9, 1998

[54] LASER LINEWIDTH MEASURING APPARATUS UTILIZING STIMULATED BRILLOUIN SCATTERING

[75] Inventors: Gap-Youl Lyu, Kyunggi-Do; Sang-Soo Lee, Daejeon; Dong-Ho Lee, Daejeon; Chang-Soo Park, Daejeon, all of Rep. of Korea

[73] Assignees: Electronics and Telecommunications Research Institute, Daejeon; Korea Telecom, Seoul, both of Rep. of Korea

[21] Appl. No.: 821,830

[22] Filed: Mar. 21, 1997

[30] Foreign Application Priority Data

Oct. 2, 1996 [KR] Rep. of Korea ............. 1996-43744

[51] Int. Cl.⁶ .................................................. G01B 9/02
[52] U.S. Cl. .......................... 356/345; 356/349; 356/73.1
[58] Field of Search .................................... 356/345, 349, 356/73.1; 385/2, 3

[56] References Cited

U.S. PATENT DOCUMENTS 5,619,364  4/1997  Burns et al. ............................ 385/3

Primary Examiner—Frank G. Font
Assistant Examiner—Robert Kim
Attorney, Agent, or Firm—Jacobson, Price, Holman & Stern, PLLC

[57] ABSTRACT

An apparatus for measuring the linewidth of a laser is disclosed in which the linewidth of a laser is measured in a wide range from a narrow linewidth to a wide linewidth by utilizing frequency-shifted rays based on a stimulated Brillouin scattering within an optical fiber in an easy and efficient manner. The apparatus according to the present invention includes: an optical signal generating and splitting means for generating optical signals under test, and for splitting them into two sets of signals; a frequency shifting means for amplifying the optical frequency of the optical source of the optical signal generating and splitting means, and then, irradiating the amplified signals into an optical fiber so as to shift the frequency based on a stimulated Brillouin phenomenon; a leading means for minimizing a loss of the frequency shifted rays outputted in a direction opposite to that of original laser beams of the frequency shifting means so as to leading them in a certain direction; and a spectrum analyzing means for receiving the original rays from the optical signal generating and splitting means and for receiving the frequency-shifted rays from the leading means so as to stimulate beatings and to analyze the beaten spectra. The apparatus is applied to measuring the linewidth and channel interval of a laser used in wavelength division multiplexing optical communications.

7 Claims, 3 Drawing Sheets

LASER LINEWIDTH MEASURING APPARATUS UTILIZING STIMULATED BRILLOUIN SCATTERING

BACKGROUND OF THE INVENTION

1. Field of the Invention

The present invention relates to a laser linewidth measuring apparatus utilizing a stimulated Brillouin scattering. Particularly, the present invention relates to a laser linewidth measuring apparatus in which the laser linewidth can be measured in a simple and efficient manner over a wide range from a narrow linewidth region to a wide region by utilizing frequency-shifted beams generated by the stimulated Brillouin scattering phenomenon within the optical fiber when high intensity rays are incoming into the optical fiber, instead of the conventional acousto-optic modulator which is used as a frequency shifter.

2. Description of the Prior Art

Recently in the optical communication field, studies are being briskly made on the wavelength division multiplexing method (WDM) using a multi-channel optical source so as to increase the transmitting capacity. In this connection, in order to know the characteristics of the multi-channel laser, the spectra of the linewidth and wavelength interval of the multi-channel laser have to be measured.

In the conventional methods for measuring the laser linewidth, there are a method using an optical spectrum analyzer, and a method based on a self delayed heterodyne beating (SDHB) as shown in FIG. 1.

In the conventional method using the optical spectrum analyzer, the resolution of the optical spectrum analyzer is 0.1 nm (about 12 GHz in the optical frequency region of 1550 nm), and therefore, the linewidth of a laser for the optical communication, in which the linewidth is about 20 MHz, cannot be measured.

Meanwhile, in the conventional method based on the self delayed heterodyne beating (SDHB), the frequency is shifted by using an acousto-optic modulator (AOM) 3, and the acousto-optic modulator is made to modulate by using a local oscillator 4.

Here, if the linewidth of the laser under test is larger than the frequency of the local oscillator 4, the linewidth of the laser cannot be measured. Therefore, as the linewidth of the laser is widened, the local oscillator 4 needs so much higher frequency. Further, The conventional methods are capable of measuring only the linewidth of single channel lasers.

SUMMARY OF THE INVENTION

The present invention is intended to overcome the above described disadvantages of the conventional techniques.

Therefore it is an object of the present invention to provide an apparatus for measuring the linewidth of a laser in which the linewidth of a laser is measured in a wide range from a narrow linewidth to a wide linewidth by utilizing frequency-shifted rays based on a stimulated Brillouin scattering within an optical fiber, and the linewidth of a single channel or multi-channel laser can also be measured.

It is another object of the present invention to provide an apparatus for measuring the linewidth of a laser in which the spectra of the linewidth and wavelength can be easily and accurately measured by using an RF spectrum analyzer having a resolution of 1 Hz.

In achieving the above object, the apparatus for measuring a linewidth of a laser according to the present invention includes: an optical signal generating and splitting means for generating optical signals under test, and for splitting them into two sets of signals; a frequency shifting means for amplifying the optical frequency of the optical source of the optical signal generating and splitting means, and then, irradiating the amplified signals into an optical fiber so as to shift the frequency based on a stimulated Brillouin phenomenon; a leading means for minimizing a loss of the frequency-shifted rays outputted in a direction opposite to that of original laser beams of the frequency shifting means so as to lead them in a certain direction; and a spectrum analyzing means for receiving the original rays from the optical signal generating and splitting means and for receiving the frequency-shifted rays from the leading means so as to stimulate beatings and to analyze the beaten spectra.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
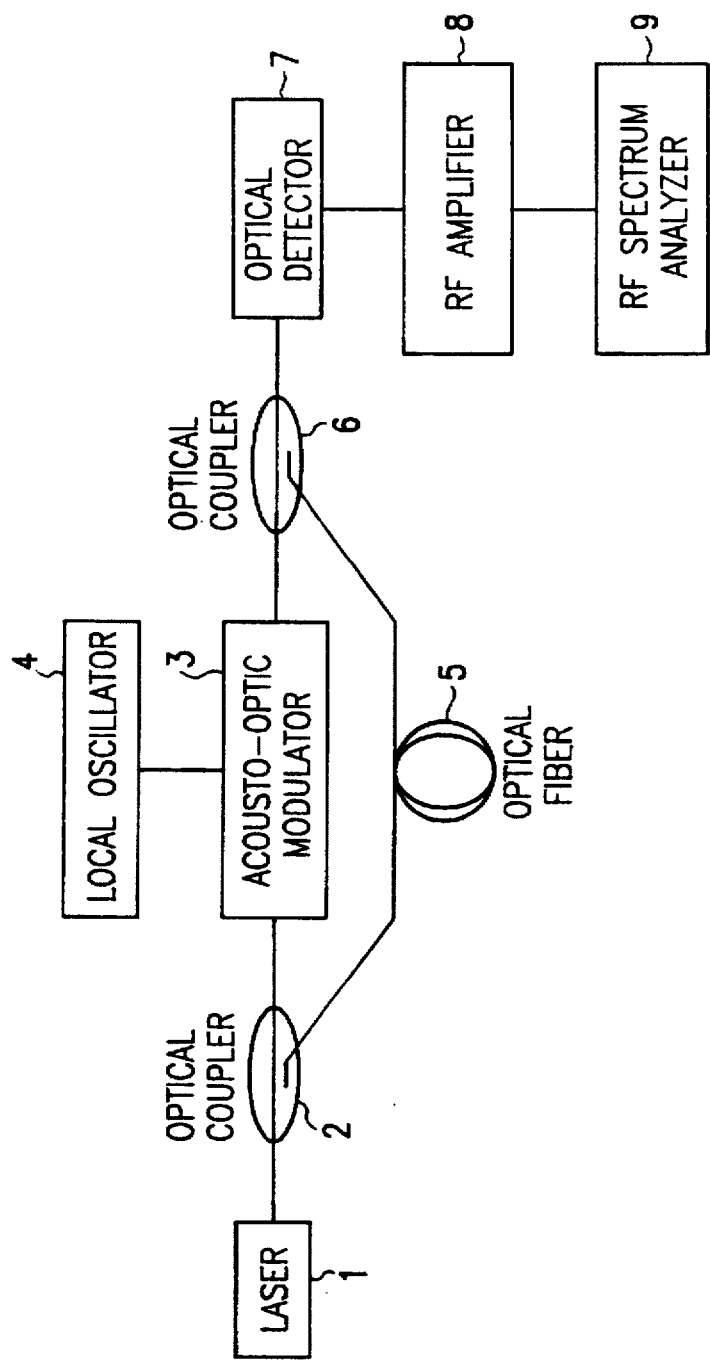
FIG. 1 illustrates the constitution of a conventional laser linewidth measuring apparatus.
Figure 2:
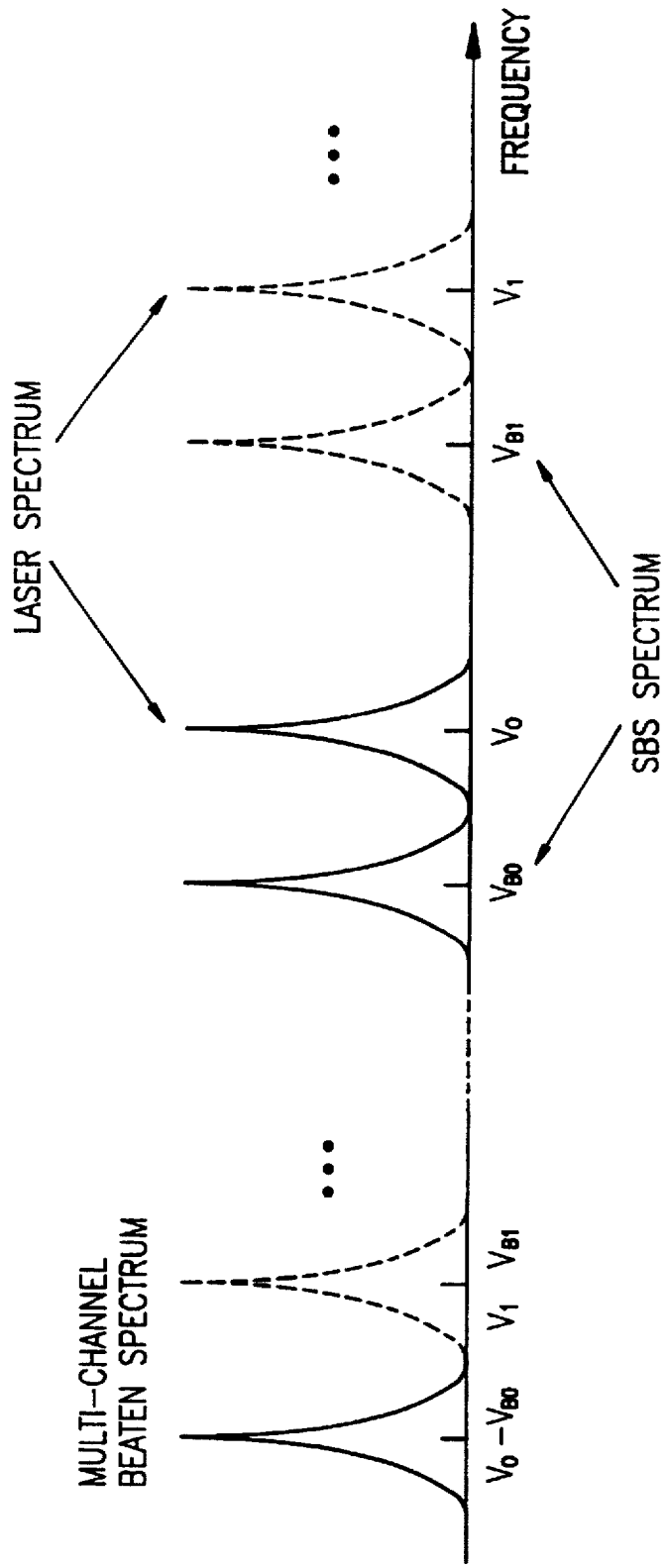
FIG. 2 illustrates the spectrum wave patterns for showing the principle of the present invention.

FIG. 2 illustrates the principle of measuring the laser linewidth by utilizing the stimulated Brillouin scattering according to the present invention.

If high intensity rays (the frequencies of which are $v_0$, $v_1$, ...) are incident into an optical fiber, then rays having new frequencies ($V_{B0}$, $V_{B1}$, ...) are generated owing to the non-linear phenomenon of the optical fiber. Among the rays, there are rays travelling in a direction opposite to that of the incident rays. This phenomenon is called stimulated Brillouin scattering (SBS).

The rays which are generated by the stimulated Brillouin scattering have a frequency smaller than that of the incident rays by about 10 GHz. If beatings ($V_0-V_{B0}<V_1-V_{B1}< ...$) are carried out on the incident rays and on the frequency-shifted rays (shifted by the stimulated Brillouin scatter), then a spectrum distribution is obtained which is formed around the frequency of the frequency difference (about 10 GHz which belongs to the RF region).

Further, the rays ($V_{B0}<V_{B1}<...$) which are generated and shifted have a frequency level proportional to that of the incident rays. Therefore, in the case of a long wavelength, the shifted frequency is smaller than the case of the short wavelength. Accordingly, when multi-channel laser rays are incident, the shifted frequencies are different depending on the wavelength, and therefore, the beaten frequency makes it possible to measure the laser linewidths and the wavelength intervals of the respective channels in the RF region in a precise and accurate manner.

Figure 3:
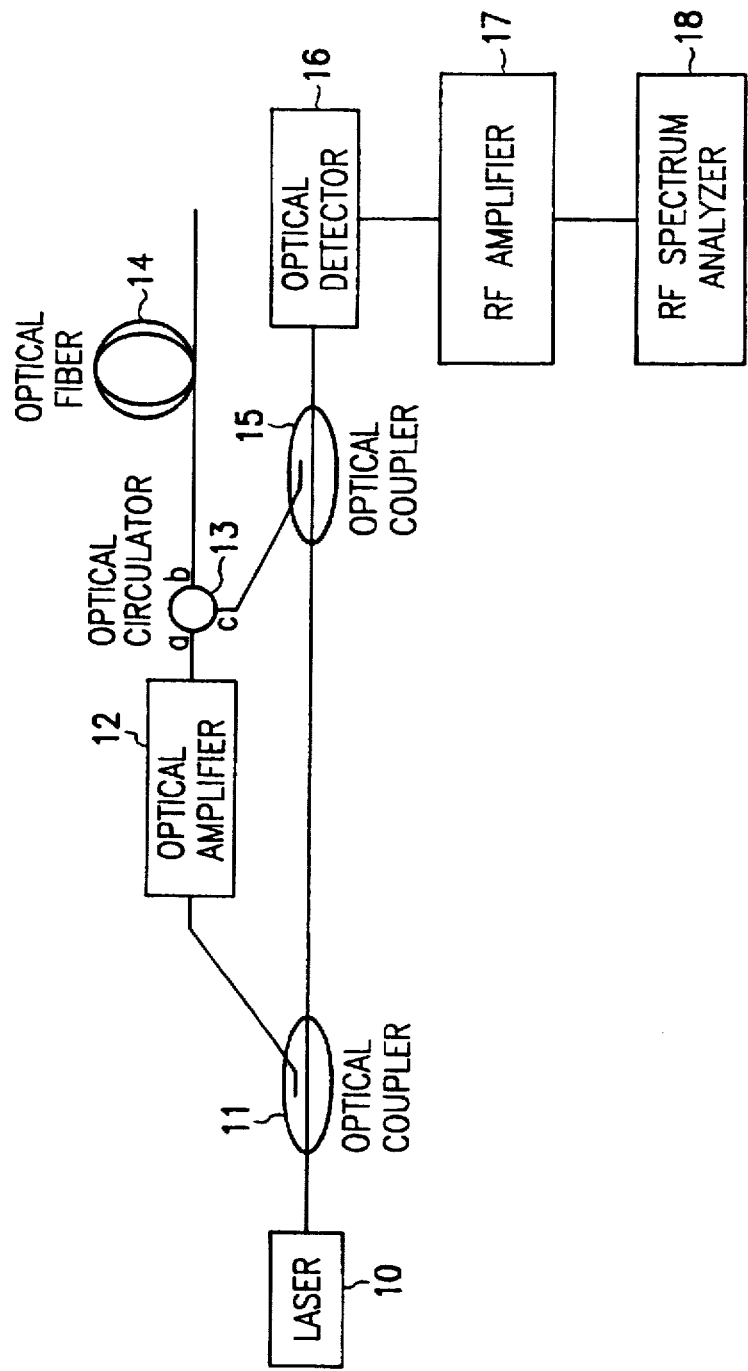
FIG. 3 illustrates the constitution of the apparatus for measuring the linewidth of a laser according to the present invention.

FIG. 3 illustrates the constitution of the apparatus for measuring the linewidth of a laser by utilizing the stimulated Brillouin scattering according to the present invention. In the drawing, reference code 10 is a laser, 11 and 15 are optical couplers, 12 is an optical amplifier, 13 is an optical circulator, 14 is an optical fiber, 16 is an optical detector, 17 is an RF amplifier, and 18 is an RF spectrum analyzer.

The laser 10 outputs single channel or multi-channel optical signals, the linewidth of which is under test. The first optical coupler 11 divides the optical signals of the laser 10 into two sets so as to output them to the optical amplifier 12 and to the second optical coupler 15 respectively.

The optical amplifier 12 amplifies the optical signals of the first optical coupler 11 into higher output signals by utilizing an optical pumping so as to supply them through the optical circulator 13 to the optical fiber 14. Thus the incident pumped optical signals undergo a stimulated Brillouin scattering within the optical fiber 14.

The optical circulator 13 operates in such a manner that the rays incident to a terminal are outputted through a terminal b, and that the rays incident to the terminal b are outputted through a terminal c. Therefore, the new rays which have been frequency-shifted through the stimulated Brillouin scattering travel in a direction opposite to that of the original rays. The optical circulator 13 guides them to the second optical coupler 15 while minimizing the optical loss of the frequency-shifted rays.

The second optical coupler 15 receives the frequency-shifted rays from the terminal c, and receives the original rays from the first optical coupler 11 so as to carry out the beating and so as to output the frequency difference between the two sets of the rays to the optical detector 16.

The optical detector 16 converts the beaten optical signals to beaten spectrum signals of the RF region so as to output them to the RF amplifier 17. The signals which have been detected by the optical detector 16 are distributed around the beat frequency within twice the laser linewidth under test.

The RF amplifier 17 amplifies the weak beat frequency of the optical detector 16 so as to output it to the RF spectrum analyzer 18.

The RF spectrum analyzer 18 which has a resolution of 1 Hz analyzes the beat frequency of the RF amplifier 17, and measures the width of the spectra.

In the above, the present invention was described based on the preferred embodiment, but it should be apparent to those ordinarily skilled in the art that various changes and modifications can be added without departing from the technical conception of the present invention. Therefore, the present invention will not be limited to the above described preferred embodiment and the drawings.

According to the present invention as described above, the apparatus for measuring the linewidth of a laser is capable of measuring a wide range from a narrow linewidth to a wide linewidth by utilizing frequency-shifted rays through a stimulated Brillouin scattering within an optical fiber, and the linewidth of a single channel or multi-channel laser can also be measured.

Further, the apparatus of the present invention is capable of measuring the linewidths and intervals of a multi-channel laser in an RF region (10 GHz) belonging to a wide frequency region (about $2 \times 10^{14}$ Hz).

What is claimed is:

1. An apparatus for measuring a linewidth of a laser, comprising:

an optical signal generating and splitting means for generating optical signals under test, and for splitting them into two sets of signals;

a frequency shifting means for amplifying the optical frequency of the optical source of the optical signal generating and splitting means, and then, irradiating the amplified signals into an optical fiber so as to shift the frequency based on a stimulated Brillouin phenomenon;

a leading means for minimizing a loss of the frequency-shifted rays outputted in a direction opposite to that of original laser beams of the frequency shifting means so as to stimulate them in a certain direction; and a spectrum analyzing means for receiving the original rays from the optical signal generating and splitting means and for receiving the frequency-shifted rays from the leading means so as to stimulate beatings and to analyze the beaten spectra.

2. The apparatus as claimed in claim 1, wherein said optical signal generating and splitting means comprises:

a laser 10 for outputting single channel or multi-channel optical signals, the linewidth of which is under test; and a first optical coupler 11 for dividing the optical signals of said laser 10 into two sets.

3. The apparatus as claimed in claim 2, wherein said frequency shifting means comprises:

an optical amplifier 12 for amplifying the optical signals of said first optical coupler 11 into higher output signals;

an optical circulator 13 for outputting the optical signals of said amplifying means to an optical fiber 14; and said optical fiber 14 causing the incident pumped optical signals to undergo a stimulated Brillouin scattering within itself, and causing the new rays to travel in a direction opposite to that of the original rays.

4. The apparatus as claimed in claim 1, wherein said stimulating means comprises: said optical circulator 13 operating in such a manner that rays incident to a terminal a are outputted through a terminal b, and that the rays incident to the terminal b are outputted through a terminal c.

5. The apparatus as claimed in claim 1, wherein said beating and spectrum analyzing means comprises:

an optical coupling means 15 for receiving the frequency-shifted rays from said stimulating means, and for receiving original rays from said optical signal generating and splitting means so as to carry out the beating and so as to output the frequency difference between the two sets of the rays;

an optical detecting means 16 for converting the beaten optical signals of said optical coupling means 15 to beaten spectrum signals of the RF region;

an RF amplifying means 17 for amplifying the weak beat frequency of said optical detecting means 16; and an RF spectrum analyzing means 18 for analyzing the beat frequency of said RF amplifying means 17, and for measuring the width of the spectra.

6. The apparatus as claimed in claim 5, wherein the optical signals detected by said optical detecting means 16 are distributed around the beat frequency of said optical coupling means 15 within twice the laser linewidth under test.

7. The apparatus as claimed in claim 5, wherein said RF spectrum analyzing means 18 has a resolution of 1 Hz.

* * * * *